United States Patent
Cardiff et al.

(10) Patent No.: US 12,217,107 B2
(45) Date of Patent: Feb. 4, 2025

(54) INTEGRATED MEMORY CARD EJECTOR AND SENSOR PORTS

(71) Applicant: Google LLC, Mountain View, CA (US)

(72) Inventors: Trevor Matthew Cardiff, Walnut Creek, CA (US); Brandon Raphael Collins-Smoot, San Jose, CA (US); Cindy Xinzi Wang, Santa Clara, CA (US); Warren Zachary Jones, Glen Ellyn, IL (US); Jeffrey Yukio Hayashida, Portland, OR (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 18/160,079

(22) Filed: Jan. 26, 2023

(65) Prior Publication Data

US 2023/0169290 A1 Jun. 1, 2023

Related U.S. Application Data

(60) Provisional application No. 63/481,485, filed on Jan. 25, 2023.

(51) Int. Cl.
*G06K 13/08* (2006.01)
*H04B 1/3818* (2015.01)

(52) U.S. Cl.
CPC ..... *G06K 13/0831* (2013.01); *G06K 13/0812* (2013.01); *H04B 1/3818* (2015.01)

(58) Field of Classification Search
CPC ........... G06K 13/0831; G06K 13/0812; G06K 13/08; G06K 13/0806; G06K 7/0021;

(Continued)

(56) References Cited

U.S. PATENT DOCUMENTS

| 5,507,658 A | 4/1996 | Ho |
| 7,510,415 B2 | 3/2009 | Wang |

(Continued)

FOREIGN PATENT DOCUMENTS

| CN | 201266962 | 7/2009 |
| EP | 2663907 | 8/2018 |
| JP | 2009251885 | 10/2009 |

OTHER PUBLICATIONS

"Non-Final Office Action", U.S. Appl. No. 16/930,201, Jun. 10, 2021, 12 pages.

(Continued)

*Primary Examiner* — Roshn K Varghese
(74) *Attorney, Agent, or Firm* — Colby Nipper PLLC

(57) ABSTRACT

This document describes apparatuses that include integrated memory card ejector and sensor ports. A first described aspect of an apparatus includes a memory card connector, a housing, and a carriage. The memory card connector includes a receiver configured to receive a memory card and an ejector assembly configured to eject the memory card from the receiver. The housing includes a sidewall that includes a memory card slot and an integrated port. The integrated port defines an outside opening of the housing. The carriage includes a slide portion slidably positioned in the integrated port and is accessible through the outside opening of the housing. The carriage includes a carriage body having an outer port, a sensor port, and an acoustic chamber defined within the carriage body. The carriage includes an ejector connector configured for contacting the ejector assembly and a sensor assembly mounted on the carriage at the sensor port.

11 Claims, 3 Drawing Sheets

(58) Field of Classification Search
CPC .... H05K 5/0256; H05K 5/026; H04B 1/3816; H04B 1/3818
See application file for complete search history.

(56) References Cited

U.S. PATENT DOCUMENTS

| | | | |
|---|---|---|---|
| 8,308,514 | B1 | 11/2012 | Su et al. |
| 8,579,640 | B2 | 11/2013 | Ho et al. |
| 8,932,080 | B2 | 1/2015 | Chang et al. |
| 9,048,594 | B2 | 6/2015 | Lim et al. |
| 9,106,310 | B2 | 8/2015 | Dondzik et al. |
| 9,203,458 | B2 | 12/2015 | Sutherland et al. |
| 9,281,610 | B2 | 3/2016 | Ejiri |
| 9,436,854 | B2 | 9/2016 | Sarraf et al. |
| 9,806,749 | B2 | 10/2017 | Sohn et al. |
| 9,832,859 | B2 | 11/2017 | Lee et al. |
| 9,876,948 | B2 | 1/2018 | Wang et al. |
| 9,980,374 | B2 | 5/2018 | Pavageau et al. |
| 9,999,165 | B2 | 6/2018 | Cho et al. |
| 10,010,016 | B2 | 6/2018 | Lim et al. |
| 10,235,609 | B1 | 3/2019 | Jeon et al. |
| 10,312,625 | B2 | 6/2019 | Andre et al. |
| 10,320,101 | B2 | 6/2019 | Brogan et al. |
| 10,334,341 | B2 | 6/2019 | Niittyinpera et al. |
| 10,403,966 | B2 | 9/2019 | Su et al. |
| 10,547,144 | B2 | 1/2020 | Mikawa |
| 10,594,348 | B2 | 3/2020 | Yang et al. |
| 10,594,845 | B2 | 3/2020 | Hebert et al. |
| 10,630,006 | B2 | 4/2020 | Mancias et al. |
| 11,201,423 | B2 | 12/2021 | Meer et al. |
| 2004/0256188 | A1 | 12/2004 | Harcourt |
| 2005/0219832 | A1 | 10/2005 | Pawlenko et al. |
| 2006/0040558 | A1 | 2/2006 | Ho |
| 2009/0143983 | A1 | 6/2009 | Venkatraman et al. |
| 2011/0298585 | A1 | 12/2011 | Barry |
| 2012/0108110 | A1 | 5/2012 | Li |
| 2013/0115796 | A1* | 5/2013 | Liu .................. G06K 13/0831 439/325 |
| 2016/0360632 | A1* | 12/2016 | Lee .................. G06K 13/0806 |
| 2017/0012376 | A1 | 1/2017 | Nakase et al. |
| 2017/0089698 | A1 | 3/2017 | Ehman et al. |
| 2017/0093057 | A1 | 3/2017 | Wang et al. |
| 2017/0153110 | A1 | 6/2017 | Matsushita |
| 2018/0069330 | A1* | 3/2018 | Cheng .............. G06K 13/0831 |
| 2018/0173904 | A1 | 6/2018 | Zhang |
| 2018/0316377 | A1 | 11/2018 | Yang et al. |
| 2019/0082547 | A1 | 3/2019 | Werner et al. |
| 2019/0272453 | A1 | 9/2019 | Argyres et al. |
| 2019/0305405 | A1 | 10/2019 | Im et al. |
| 2020/0027265 | A1 | 1/2020 | Levy et al. |
| 2021/0296805 | A1 | 9/2021 | Meer et al. |

OTHER PUBLICATIONS

"Nofice of Allowance", U.S. Appl. No. 16/930,201, Oct. 18, 2021, 9 pages.

Cornell, "Techniques for Accurately Determining a Current Location of a Device", Technical Disclosure Commons, https://www.tdcommons.org/dpubs_series/4033, Jan. 29, 2021, 8 pages.

Galbraith, "Multilateration in Direct ShortRange Communications Networks: Utilising Basic Safety Messages and Received Signal Strength Ranging", Retrieved at: http://www.diva-portal.org/smash/record.jsf?divs2%3A1460791&dswid=7952, Aug. 25, 2020, 40 pages.

Moore, "Computing Devices with Concealed Barometric Ports", Sep. 14, 2020, 7 pages.

* cited by examiner

INTEGRATED MEMORY CARD EJECTOR AND SENSOR PORTS

INCORPORATION BY REFERENCE

This application claims priority under 35 U.S.C. § 119 (e) to U.S. Provisional Patent Application 63/481,485, filed on Jan. 25, 2023, which is incorporated herein by reference in its entirety.

SUMMARY

This document describes integrated memory card ejector and sensor ports for computing devices. A first described aspect of an apparatus includes a memory card connector, a housing, and a carriage. The memory card connector includes a receiver configured to receive a memory card and an ejector assembly configured to eject the memory card from the receiver. The housing includes a sidewall and a cavity that is configured to receive the memory card connector. The sidewall includes, defined therethrough, a memory card slot and an integrated port. The integrated port defines an outside opening of the housing. The carriage includes a slide portion that is slidably positioned in the integrated port and is accessible through the outside opening of the housing. The carriage is configured to actuate the ejector assembly. The carriage includes a carriage body having an outer port, a sensor port, and a chamber defined within the carriage body. The chamber extends between the outer port and the sensor port. The carriage further includes an ejector connector that is configured for contacting the ejector assembly and a sensor assembly mounted on the carriage at the sensor port.

This Summary is provided to introduce simplified concepts of integrated memory card ejector and sensor ports for computing devices, which are further described below in the Detailed Description and are illustrated in the Drawings. This Summary is intended neither to identify essential features of the claimed subject matter nor for use in determining the scope of the claimed subject matter.

BRIEF DESCRIPTION OF THE DRAWINGS

The details of one or more aspects of integrated memory card ejector and sensor ports for computing devices are described in this document with reference to the following Drawings, wherein the use of same numbers in different instances may indicate similar features or components.

DETAILED DESCRIPTION

This document describes integrated memory card ejector and sensor ports for computing devices. Through such integration, one or more ports (e.g., a microphone port, a sensor port, a speaker port, a Subscriber Identity Module (SIM) card tray port, a SIM card tray ejector port) can be concealed within another port. In aspects, a microphone sensor port and an ejection port of a SIM card tray are integrated together into an integrated memory card ejector and sensor port.

Figure 1:
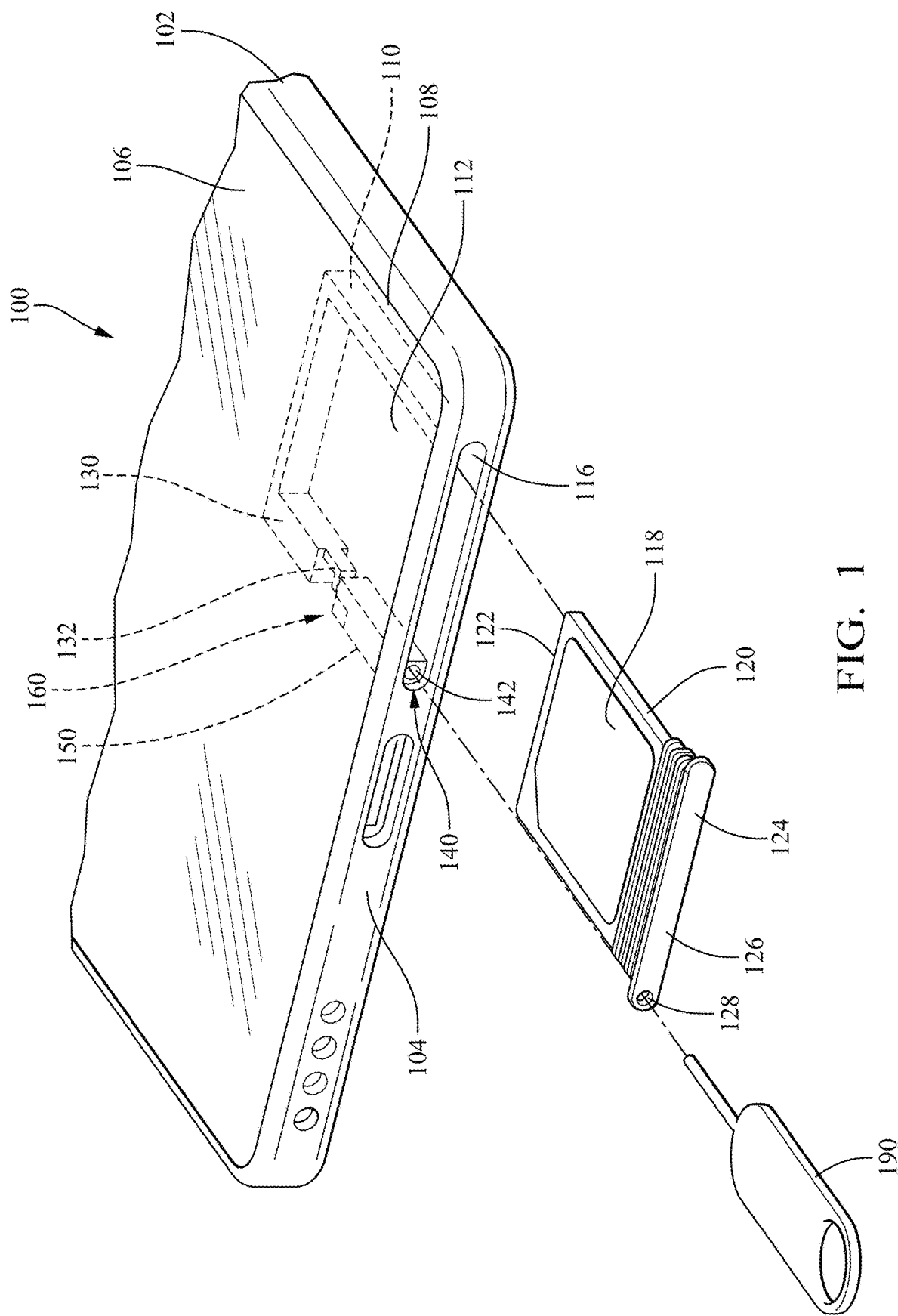
FIG. 1 is a partial, exploded, perspective view of an apparatus including an integrated memory card ejector and sensor port.

FIG. 1 is a partial, exploded, perspective view of an apparatus 100 (e.g., a computing device) that includes an integrated memory card ejector and sensor port 140 (integrated port 140). While the apparatus 100 is illustrated as a mobile consumer electronic device (e.g., mobile phone, tablet computer, smart watch), in aspects the apparatus may be another type of computing device.

The apparatus 100 includes a housing 102 with at least one sidewall 104. In the aspect illustrated in the Figures, the sidewall 104 includes a memory card slot 116 and the integrated port 140 defined through the sidewall 104. The integrated port 140 may be defined in the memory card slot 116. The integrated port 140 defines an outside opening 142 of the housing 102. In the aspect illustrated in the Figures, the outside opening 142 of the housing 102 may include a door port 128 of a door 126, as described below.

The apparatus 100 illustrated in FIG. 1 includes a front cover 106 and a back cover (not illustrated). The front cover 106 may include a display panel module. The front cover 106, the back cover, and the sidewall(s) of the housing 102 define at least one cavity 108 therebetween. One or more computing device components (e.g., circuit boards, sensors, processors, memory, a memory card connector, and the like) may be received and/or positioned within the cavity 108.

In the aspect illustrated in FIG. 1, a memory card connector 110 is provided in the cavity 108 of the apparatus 100. The memory card connector 110 includes a memory card receiver 112 (receiver 112) that includes a plurality of conductive terminals. The receiver 112 is configured to receive a memory card 118 and to read/write data on the memory card 118. The memory card 118 may be an electronic data storage device (e.g., flash memory) used for storing digital information. Examples of memory cards 118 include Secure Digital (SD) cards (e.g., a microSD card), smart cards, integrated circuit cards, universal integrated circuit cards (UICC) (e.g., a SIM card), and the like.

As illustrated in FIG. 1, the memory card 118 may be carried to the receiver 112 through a tray 120 or another memory card carrier mechanism. The tray 120 is configured for holding the memory card 118 and is slidable relative to the memory card connector 110 to enable the memory card 118 to be slid into engagement with the conductive terminals of the receiver 112. In other aspects, a tray may not be utilized and the memory card 118 may be configured to be directly inserted into the receiver 112. In the aspect illustrated, the tray 120 has a first end 122 configured for insertion into the memory card slot 116 defined in the sidewall 104 and a second end 124 that includes a door 126. In this configuration, the first end 122 is opposite the second end 124. The door 126 includes a door port 128 defined therethrough and aligned with the integrated port 140, such that the door 126 permits access to the integrated port 140 through the door port 128. In aspects, the door 126 is configured to close the memory card slot 116. The tray 120 may include one or more O-rings, gaskets, or other seals configured to restrict the ingress of contaminants (e.g., liquid, dust, debris) into the apparatus 100.

The memory card connector 110 further includes an ejector assembly 130 configured to eject the memory card 118 from the receiver 112. For example, the ejector assembly 130 may include an ejector arm 132 configured to move linearly to contact a pivotally connected ejection mechanism, where a linear force applied to the ejector arm 132 is translated to a force that pushes against a portion of the memory card 118 (or the tray 120 holding the memory card 118), to eject the memory card 118 (or tray 12) from the receiver 112. The ejector assembly 130 may also be configured to reset a position of a carriage 150. For example, the insertion of the tray 120 into the receiver 112 may cause the ejector assembly 130 to move the carriage 150 towards the sidewall 104.

Figure 2:
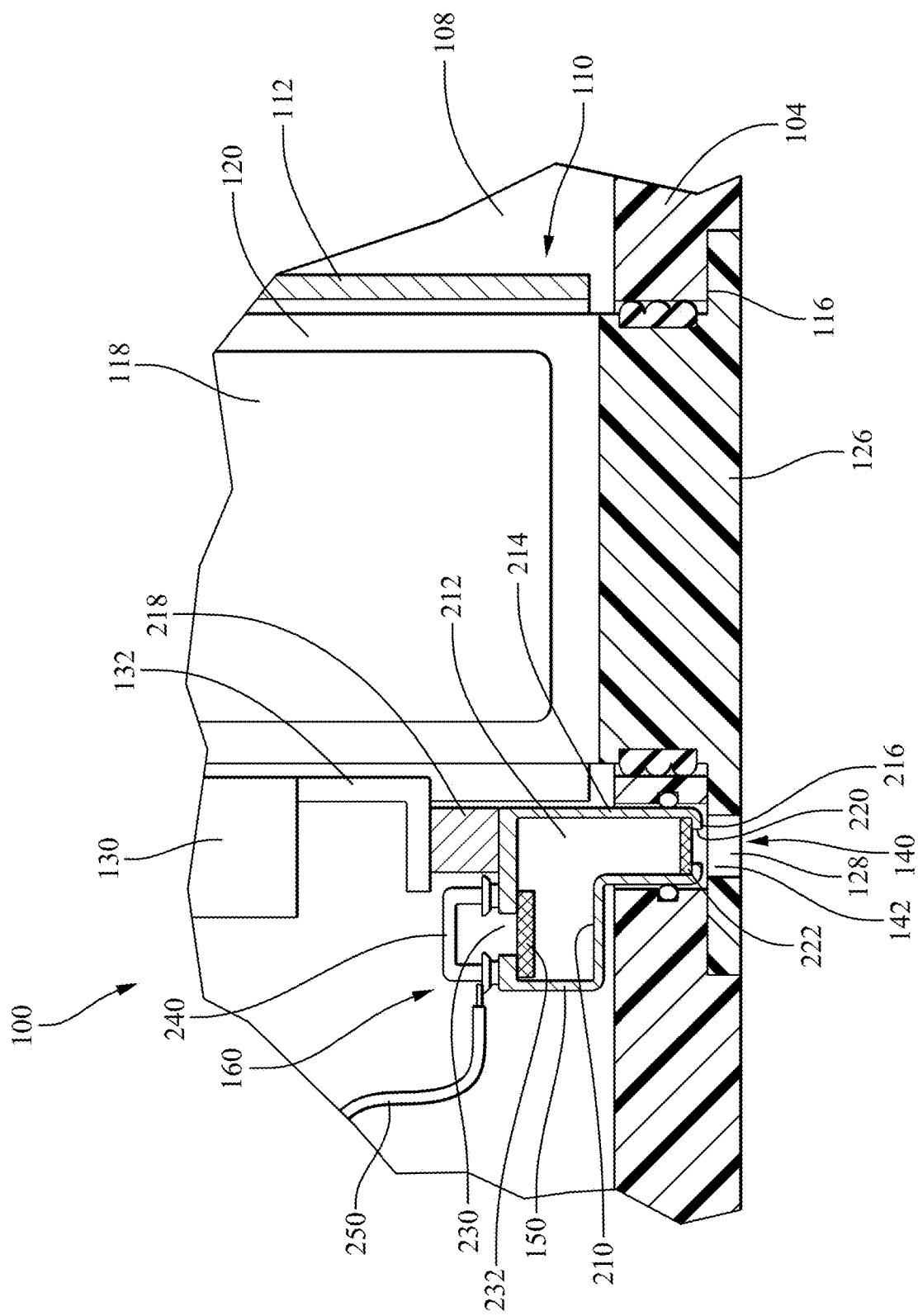
FIG. 2 is a partial, schematic plan view of the apparatus of FIG. 1, illustrating an ejector assembly in a loaded position.
Figure 3:
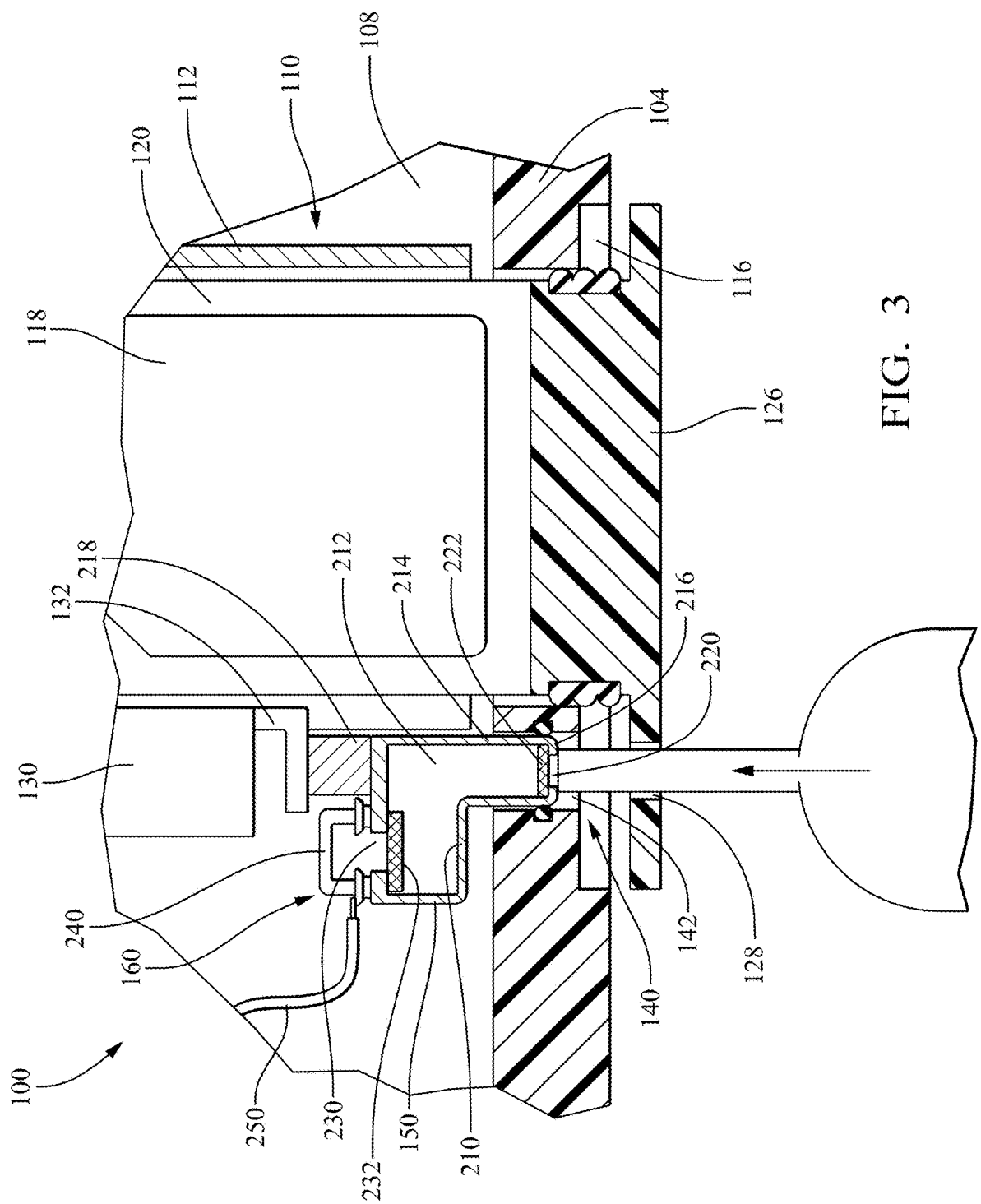
FIG. 3 is a partial, schematic plan view of the apparatus of FIG. 1, illustrating the ejector assembly in an eject position.

FIG. 2 illustrates a partial, schematic plan view of the apparatus 100 of FIG. 1 that illustrates the ejector assembly 130 in a loaded position. FIG. 3 illustrates a partial, schematic plan view of the apparatus 100 of FIG. 1 that illustrates the ejector assembly 130 in an eject position. The ejector assembly 130 can be moved from the loaded position, where the memory card 118 is loaded into the memory card connector 110, to the eject position, where the memory card 118 is ejected from the memory card connector 110. Likewise, the insertion of the memory card 118 into the memory card connector 110 may move the ejector assembly 130 from the eject position to the loaded position.

The apparatus 100 includes a movable carriage 150 configured to transfer an eject force input from an eject tool 190 (e.g., SIM card eject tool, paper clip) to the ejector assembly 130 to cause the ejector assembly 130 to be moved from the loaded position (illustrated in FIG. 2) to the eject position (illustrated in FIG. 3). The ejector assembly 130 may include an ejector arm 132 configured to actuate the ejector assembly 130. In the eject position, the ejector arm 132 may be moved to actuate the ejector assembly 130 to eject the memory card 118 from the receiver 112 of the memory card connector 110.

The carriage 150 includes a carriage body 210. A chamber 212 is defined in the carriage body 210. In aspects, the chamber 212 is an acoustic chamber configured to permit sound waves to pass from an exterior environment of the apparatus 100 to a sensor assembly 160 within the cavity 108 of the apparatus 100. The chamber 212 may extend between at least one outer port 220 (e.g., an acoustic port) and at least one sensor port 230 (e.g., a microphone port). The outer port 220 and the sensor port 230 may be configured to permit sound waves to enter into and exit out from the chamber 212. In FIGS. 2 and 3, the chamber 212 is V-shaped, having a first portion oriented with a perpendicular jog relative to a second portion. In other aspects, the chamber 212 may have other shapes (e.g., U-shaped, curved, arced, round, straight, and the like).

In the aspect illustrated in FIGS. 1-3, the outer port 220 is positioned proximal to the integrated port 140 defined through the sidewall 104. The outer port 220 may be interrupted by a sound-permeable membrane (e.g., air-permeable membrane, acoustic mesh, hydrophobic seal) through which sound is able to pass into or out of the cavity 108. The membrane restricts the ingress of contaminants (e.g., liquid, dust, debris) into the cavity 108 of the housing 102. As illustrated in FIG. 2, the outer port 220 is interrupted by an outer membrane 222.

FIGS. 1-3 further illustrate the sensor port 230 positioned spaced apart from and distal the integrated port 140. The sensor port 230 may also be interrupted by a sound-permeable membrane through which sound is able to pass into or out of the cavity 108. The membrane restricts the ingress of contaminants (e.g., liquid, dust, debris) into the housing 102. As illustrated in FIG. 3, the sensor port 230 is interrupted by an inner membrane 232.

The carriage 150 is slidably mounted within the housing 102 and is configured to move from a loaded position (illustrated in FIG. 2) to an eject position (illustrated in FIG. 3). In the loaded position, the memory card 118 is received within the receiver 112. As illustrated in FIG. 2, the memory card 118 is held in the tray 120, and the memory card 118/tray 120 are received with the receiver 112 of the memory card connector 110. The tray 120 is illustrated as inserted through the memory card slot 116 defined in the sidewall 104, with the second end 124 that includes the door 126 closing the memory card slot 116. The door 126 includes a door port 128 defined therethrough and aligned with the integrated port 140, which permits access to the integrated port 140 through the door port 128.

In the eject position, the memory card 118 is ejected from the receiver 112. As illustrated in FIG. 3, the carriage 150 transfers an eject force input from the eject tool 190 to the ejector assembly 130 to cause the ejector assembly 130 to be moved from the loaded position (illustrated in FIG. 2) to the eject position (illustrated in FIG. 3). As illustrated in the aspect of FIGS. 2 and 3, the ejector assembly 130 includes an ejector arm 132 that is configured to actuate the ejector assembly 130. The carriage 150 contacts the ejector arm 132 (e.g., at an ejector connector 218) so that movement of the carriage 150 causes movement of the ejector arm 132 of the ejector assembly 130, actuating the ejector assembly 130 to eject the memory card 118 and/or the tray 120 holding the memory card 118 from the receiver 112 of the memory card connector 110. In such an arrangement, the door 126 of the tray 120 may no longer close the memory card slot 116. In aspects, the carriage 150 may be moved from the eject position (FIG. 3) to the loaded position (FIG. 2) by the insertion of the memory card 118 into the receiver 112. For example, the insertion of the tray 120 holding the memory card 118 into the receiver 112 may cause the ejector assembly 130 to reverse. This results in the ejector arm 132 and the carriage 150 slidably moving towards the sidewall 104, returning the apparatus 100 to the position illustrated in FIG. 2.

The carriage 150 may be slidably positioned within the integrated port 140 and able to be moved from a first position (illustrated in FIG. 2) where the memory card 118 is engaged with the receiver 112 to a second position (illustrated in FIG. 3) where the memory card 118 is disengaged from the receiver 112. In aspects, the carriage 150 includes a slide portion 214 that extends from the carriage body 210, with the slide portion 214 slidably received within the integrated port 140. The slide portion 214 is accessible through the outside opening 142 of the housing 102. A tip of an eject tool 190 can be inserted through the outside opening 142 to contact an ejection surface 216 of the slide portion 214 of the carriage body 210 to apply an ejection force to the carriage 150. The slide portion 214 may include one or more O-rings, gaskets, or other seals configured to restrict the ingress of contaminants (e.g., liquid, dust, debris) into the apparatus 100.

The carriage 150 further includes an ejector connector 218 that is configured to contact the ejector assembly 130 to actuate the ejector assembly 130. In aspects the ejector connector 218 is a portion of the carriage body 210. The ejector connector 218 is configured to contact the ejector arm 132, and the ejector arm 132 is configured to actuate the ejector assembly 130. In aspects, an adhesive is used to connect the ejector connector 218 to the ejector arm 132. Likewise, the ejector arm 132 is configured to move the ejector connector 218 (and carriage 150) from the eject position to the loaded position.

FIGS. 2 and 3 illustrate the outer port 220 defined in the end of the slide portion 214 that includes the ejection surface 216. The ejection surface 216 configured to receive the tip of the eject tool 190. Application of an eject force by the tip of the eject tool 190 to the ejection surface 216 causes the carriage 150 to slidably move relative to the housing 102, which brings the ejector connector 218 of the carriage 150 into contact with the ejector assembly 130 to actuate the ejector assembly 130 and eject the memory card 118 from the receiver 112.

The sensor assembly 160 may include at least one sensor module 240 (e.g., a microphone, an acoustic sensor, a pressure sensor, a light sensor, an optical sensor, an image sensor, a barometric sensor, and the like). In the aspect illustrated in the Figures, the sensor module 240 is a microphone. The sensor assembly 160 is mounted on the carriage 150 and is located within the cavity 108 of the apparatus 100. For example, the sensor assembly 160 may mount on the carriage 150 at the sensor port 230. An adhesive sandwich may be used to mount the sensor assembly 160 to the carriage 150 at the sensor port 230. In such a configuration, movement of the carriage 150 (e.g., from a first position to a second position) likewise results in movement of the sensor assembly 160 (e.g., sensor module 240) relative to the sidewall 104 of the housing 102.

The sensor assembly 160 may further include at least one flexible circuit 250. In aspects, the flexible circuit 250 connects the sensor module 240 to another component of the apparatus 100 (e.g., to a main logic board), and the flexible circuit 250 is configured to move dynamically with the motion of the sensor module 240.

CONCLUSION

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The entities of the Figures may be further divided, combined, used along with other sensors or components, and so on. In this way, different implementations of the apparatuses, with different configurations, can be used to implement integrated memory card ejector and sensor ports for computing devices. The detailed illustrations of the Figures illustrate but some of many possible environments and devices capable of employing the described integrated ports.

Although concepts of integrated memory card ejector and sensor ports for computing devices have been described in language specific to techniques and/or apparatuses, it is to be understood that the subject of the appended claims is not necessarily limited to the specific techniques or apparatuses described. Rather, the specific techniques and apparatuses are disclosed as example implementations of ways in which integrated memory card ejector and sensor ports for computing devices may be implemented.

What is claimed is:

1. An apparatus comprising:
   a memory card connector, the memory card connector comprising:
      a receiver configured for receiving a memory card; and
      an ejector assembly configured for ejecting the memory card from the receiver;
   a housing, the housing comprising:
      a cavity defined within the housing, the cavity receiving the memory card connector; and
      a sidewall, the sidewall comprising:
         a memory card slot defined through the sidewall; and
         an integrated port defined through the sidewall, the integrated port defining an outside opening of the housing;
   a carriage slidably mounted within the housing and slidably moving relative to the housing from a first position to a second position where the carriage actuates the ejector assembly, the carriage accessible through the outside opening of the housing, the carriage comprising:
      a slide portion slidably positioned in the integrated port;
      a carriage body, the carriage body comprising:
         an outer port defined in the carriage body;
         a sensor port defined in the carriage body; and
         a chamber defined within the carriage body, the chamber extending between the outer port and the sensor port;
      an ejector connector configured for contacting the ejector assembly; and
      a sensor assembly, the sensor assembly mounted on the carriage at the sensor port.

2. The apparatus of claim 1, wherein the carriage further comprises:
   an ejection surface, the ejection surface configured for receiving an eject force from an eject tool that slidably moves the ejector connector of the carriage into contact with the ejector assembly to move the ejector assembly from a loaded position to an eject position,
   wherein in the eject position the ejector connector actuates the ejector assembly to eject the memory card from the receiver.

3. The apparatus of claim 1, wherein the sensor assembly further comprises:
   a sensor module; and
   a flexible circuit connecting to the sensor module.

4. The apparatus of claim 3, wherein the sensor module is a microphone sensor.

5. The apparatus of claim 1, further comprising:
   a tray configured for holding the memory card, the tray comprising a first end opposite a second end, the first end configured for insertion into the memory card slot defined through the sidewall, the second end comprising a door configured to close the memory card slot.

6. The apparatus of claim 5, further comprising:
   a door port defined through the door, the door port configured to provide access to the integrated port.

7. The apparatus of claim 1, further comprising:
   a tray configured for holding the memory card,
   wherein the ejector assembly is configured for ejecting the memory card from the receiver by ejecting the tray.

8. The apparatus of claim 7, wherein insertion of the tray into the receiver causes the ejector assembly to move the carriage towards the sidewall.

9. The apparatus of claim 1, wherein the memory card comprises at least one of:
   a Secure Digital (SD) card;
   a smart card;
   a universal integrated circuit card (UICC); or
   a Subscriber Identity Module (SIM) card.

10. The apparatus of claim 1, wherein the outer port is interrupted by a sound-permeable membrane.

11. The apparatus of claim 1, wherein the sensor port is interrupted by a sound-permeable membrane.

* * * * *